(12) United States Patent
Kwon et al.

(10) Patent No.: US 10,234,326 B2
(45) Date of Patent: Mar. 19, 2019

(54) INDICATION TYPE LEVEL INDICATOR INCLUDING TOTAL REFLECTION PRISM

(71) Applicant: KEPCO ENGINEERING AND CONSTRUCTION COMPANY, INC., Gyeongsangbuk-do (KR)

(72) Inventors: Hyuk Jin Kwon, Gyeongsangbuk-do (KR); Chang Sun Yoon, Gyeonggi-do (KR); Mul Kwan Park, Gyeonggi-do (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 0 days.

(21) Appl. No.: 15/713,550

(22) Filed: Sep. 22, 2017

(65) Prior Publication Data
US 2018/0128669 A1    May 10, 2018

(30) Foreign Application Priority Data
Nov. 7, 2016 (KR) ................ 10-2016-0147638

(51) Int. Cl.
*G01F 23/68* (2006.01)
*G01F 23/64* (2006.01)
(Continued)

(52) U.S. Cl.
CPC ........ *G01F 23/686* (2013.01); *G01F 23/0046* (2013.01); *G01F 23/02* (2013.01); *G01F 23/64* (2013.01); *G01F 23/76* (2013.01)

(58) Field of Classification Search
CPC ......... G01F 23/686; G01F 23/64; G01F 23/56
See application file for complete search history.

(56) References Cited

U.S. PATENT DOCUMENTS

| 4,938,590 A | * | 7/1990 | Ishida | ............ F17C 13/021 |
| | | | | 356/5.01 |
| 7,043,984 B2 | * | 5/2006 | Fling | ............... G01F 23/04 |
| | | | | 73/315 |
| 2014/0325856 A1 | * | 11/2014 | Rothbucher | ........ G01C 15/06 |
| | | | | 33/293 |

FOREIGN PATENT DOCUMENTS

JP    04-331326    11/1992
JP    05002364 A  *  1/1993
(Continued)

OTHER PUBLICATIONS

Notice of Allowance for Korean Patent Application No. 10-2016-0147638, dated Jun. 15, 2018, pp. 6.

*Primary Examiner* — Erika J Villaluna
(74) *Attorney, Agent, or Firm* — Schwabe Williamson & Wyatt, P.C.

(57) ABSTRACT

Provided is an indication type level indicator including a total reflection prism provided on a float buoyant in the indication type level indicator so that, when laser is irradiated from an upper portion of the float, the laser is scattered by the total reflection prism and thus level legibility is improved. The indication type level indicator includes a chamber filled with a fluid and including a reading portion through which a level of the fluid is measured; the float provided in the chamber and including a material buoyant on the fluid moving vertically in the chamber along with the fluid; the total reflection prism provided on the float and configured to scatter light; and a laser module configured to irradiate laser to the total reflection prism so that the laser irradiated from the laser module is scattered by the total reflection prism to the reading portion.

8 Claims, 7 Drawing Sheets

(51) Int. Cl.
  *G01F 23/76* (2006.01)
  *G01F 23/00* (2006.01)
  *G01F 23/02* (2006.01)

(56) References Cited

FOREIGN PATENT DOCUMENTS

| | | |
|---|---|---|
| JP | 05-019921 | 3/1993 |
| JP | 2013-108888 | 6/2013 |
| KR | 100788140 | 12/2007 |
| KR | 20140025659 A | 3/2014 |

\* cited by examiner (Background)

(Background)

INDICATION TYPE LEVEL INDICATOR INCLUDING TOTAL REFLECTION PRISM

CROSS-REFERENCE TO RELATED APPLICATION

This application claims the benefit of Korean Patent Application No. 10-2016-0147638, filed on Nov. 7, 2016, in the Korean Intellectual Property Office, the disclosure of which is incorporated herein in its entirety by reference.

BACKGROUND

1. Field

One or more embodiments relate to an indication type level indicator including a total reflection prism, and more particularly, to an indication type level indicator including a total reflection prism provided in a float buoyant in the indication type level indicator so that level legibility is increased when a laser beam is irradiated from an upper portion of the float and is scattered by the total reflection prism.

2. Description of the Related Art

A water gauge for measuring water level is used in various tanks and heaters employed in a power plant or other plant. Water gauges of an equilibrium reflection type, an equilibrium glass type water gauge, etc. are used in the fields. FIGS. 1A and 1B show a water gauge according to the related art. The water gauge according to the related art includes a chamber 10, a front cover 21, a back cover 22, a glass portion 30, and a bolt 40. The chamber 10 is filled with a fluid, and a level of the fluid filled in the chamber 10 may be seen via the glass portion 30. The glass portion 30 is fixed by the front cover 21, the back cover 22, and the bolt 40 around the chamber 10. However, the above water gauge according to the related art has the following problems.

When the water gauge of the related art is used, it is frequently difficult to identify the water level due to contamination of the glass portion 30 for identifying the water level or interference with a steam part for generating steam. Also, a region where the tanks or heaters are located in a plant is not generally provided with additional illumination for the water gauge, and thus, legibility of the water gauge is very poor unless a lantern, etc., is used.

In order to address the above problem, a magnetic type water gauge is used. A magnetic type water gauge disclosed in Registered Patent No. 10-0788140 indicates a water level by using a magnetic type indicator. In the magnetic type water gauge, a plurality of flaps that are sequentially turned over by a magnet that moves up within the magnetic type indicator are arranged in a longitudinal direction, and a front surface and a back surface of each flap are discriminated from each other by colors so that the water level is displayed via the plurality of flaps that are turned over (see FIGS. 1, 2, and 3 of Registered Patent No. 10-0788140).

However, it is difficult to measure the water level that varies by using the analog type magnetic water gauge that measures the water level by identifying the front and back surfaces of the plurality of flaps and a possibility of erroneous measurement is very high because the flap may break frequently. Also, the unit price of the magnetic type water gauge is very expensive when compared with the glass type water gauge, and thus, it is difficult to apply the magnetic water gauge to all tanks and heaters used in a power plant or another plant.

SUMMARY

One or more embodiments include an indication type level indicator including a total reflection prism, wherein the total reflection prism is provided on a float buoyant in the indication type level indicator and a laser beam is irradiated from an upper portion of the float and is scattered through the total reflection prism so that level legibility is improved.

Additional aspects will be set forth in part in the description which follows and, in part, will be apparent from the description, or may be learned by practice of the presented embodiments.

According to one or more embodiments, an indication type level indicator for measuring fluid level, the indication type level indicator includes: a chamber filled with a fluid and including a reading portion through which the fluid level is measured; a float provided in the chamber and comprising a buoyant material so that the float floats on the fluid and vertically moves up in the chamber along with the fluid; a total reflection prism provided on the float and configured to scatter light; and a laser module configured to irradiate laser toward the total reflection prism, wherein the laser irradiated from the laser module is scattered by the total reflection prism toward the reading portion.

The indication type level indicator may further include a tank connected to the chamber and configured to store the fluid, wherein fluid level in the tank may be identical with the fluid level in the chamber.

The reading portion may be provided in a front surface of the chamber and may include a semi-transparent glass or plastic material. The float may include a guide hole penetrating through the float, a rail extending in a vertical lengthwise direction of the chamber is provided in the chamber, and the float may be inserted in the rail via the guide hole so as to perpendicularly elevate in the chamber along with the rail.

A buoyancy forming block including a buoyant material and a weight for adjusting buoyancy may be provided in the float. Two brackets may be arranged on a top surface of the float and the total reflection prism may be rotatably inserted between the two brackets.

The laser module may include: a power supply including a battery configured to supply electric power to the laser module, and a connector configured to receive electric power supplied from outside; and a variable resistor configured to adjust a laser output from the laser module according to peripheral conditions. The laser module may include a motion sensor configured to allow the electric power to be supplied only when a moving object approaches the motion sensor within a predetermined radius.

The laser module may be located above the chamber and may be configured to irradiate the laser towards the float in the chamber in a direction parallel with the vertical lengthwise direction of the chamber, so that the laser may be scattered by the total reflection prism provided in the float toward the reading portion arranged in a perpendicular direction to the vertical lengthwise direction of the chamber.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
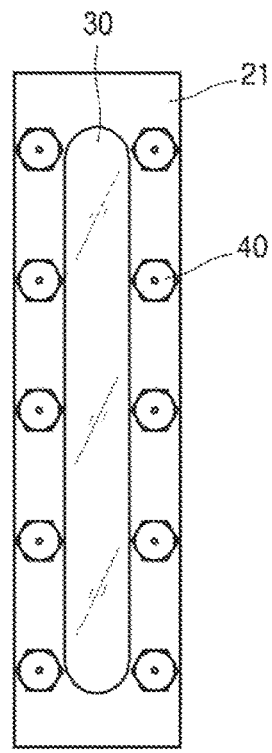
FIG. 1A is a side view of a water gauge according to the related art.
Figure 1B:
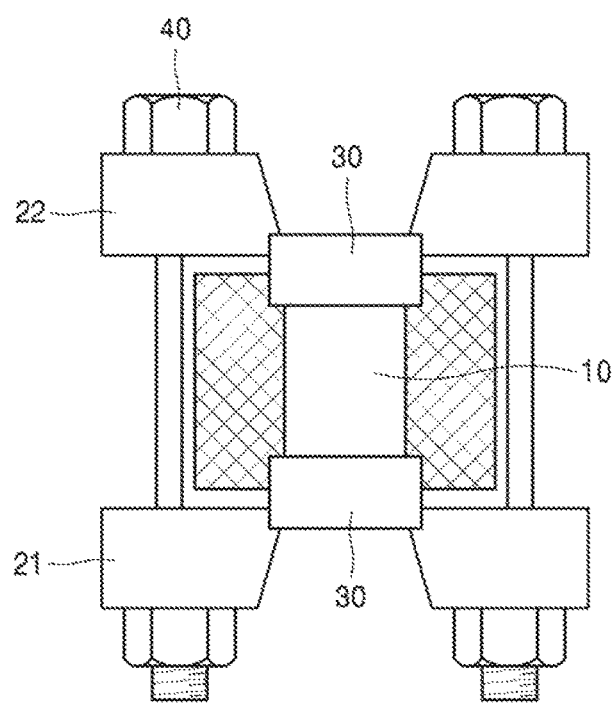
FIG. 1B is a top view of a water gauge according to the related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

The present disclosure relates to an indication type level indicator including a total reflection prism, wherein the total reflection prism is provided on a float buoyant in the indication type level indicator so that when a laser beam is irradiated from an upper portion of the float and is dispersed through the total reflection prism so that level legibility is improved. Hereinafter, one or more embodiments of the present disclosure will be described below with reference to accompanying drawings.

Figure 2:
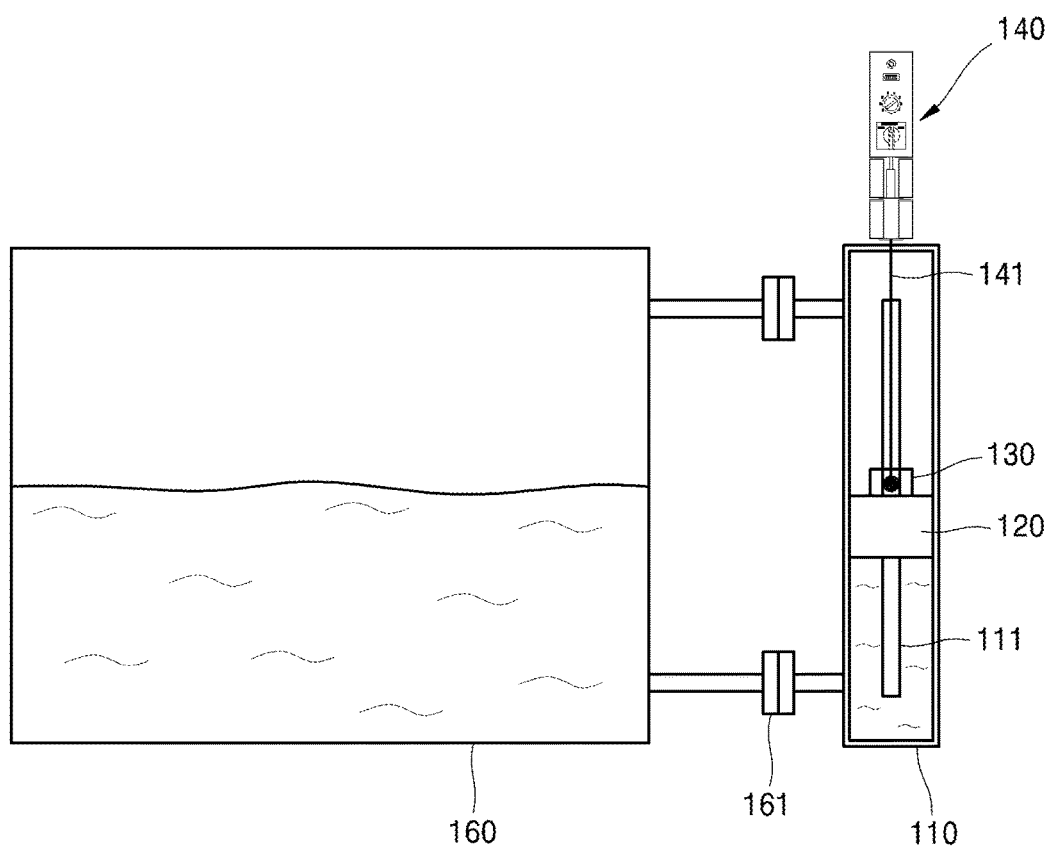
FIG. 2 is a diagram of an indication type level indicator including a total reflection prism according to an embodiment of the present disclosure.

Referring to FIG. 2, the indication type level indicator according to the embodiment of the present disclosure includes a chamber 110, a float 120, a total reflection prism 130, and a laser module 140.

The chamber 110 is filled with a fluid, and includes a reading portion 111 through which a level of the fluid may be measured. The chamber 110 may be a container filled with the fluid. The chamber 110 may be independently used, or may be used in combination with a tank 160 that stores the fluid. The chamber 110 may be connected to the tank 160 via a flange 161, etc. Since the flange 161 is well known in the art, detailed descriptions thereof are omitted.

That is, the chamber 110 is provided to measure the fluid level in the tank 160. To do this, the fluid level in the tank 160 is identical with the fluid level in the chamber 110, and thus, the fluid level in the tank 160 may be identified by identifying the fluid level in the chamber 160.

The reading portion 111 is provided in a front surface of the chamber 110, and a user may observe the reading portion 111 with the naked eye. The reading portion 111 may include a semi-transparent glass or plastic material. The reading portion 111 uses laser 141 scattered by the total reflection prism 130, which will be described later. The scattered laser 141 is scattered toward the reading portion 111 while passing through the reading portion 111 so that the fluid level may be visible.

In order to make the reading portion 111 visible by using the scattered laser 141, the reading portion 111 may include a semi-transparent glass or plastic material. However, embodiments of the present disclosure are not limited thereto, and the reading portion 111 may include various materials as long as the reading portion 111 may be legible by using the scattered laser 141. Also, numbers or indexes by which the fluid level may be identified may be provided on the reading portion 111, and as such, the user may recognize the fluid level in the chamber 110 or in the tank 160.

The float 120 is provided in the chamber 110, and may include a material buoyant on the fluid. The float 120 floats on the fluid filled in the chamber 110, and may move perpendicularly in the chamber 110 along with the fluid (with reference to FIG. 2, the perpendicular direction is an elongation direction in a lengthwise direction of the chamber 110).

Figure 3:
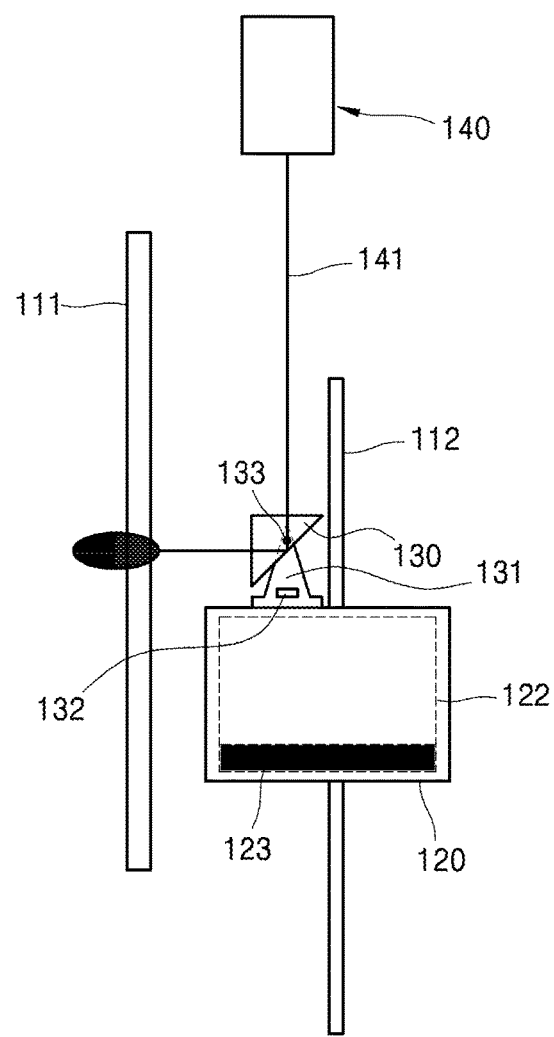
FIG. 3 is a side view of the indication type level indicator including the total reflection prism according to an embodiment of the present disclosure.

Referring to FIG. 3, the float 120 includes a buoyancy forming block 122 including a buoyant material and a weight 123 that may adjust the buoyancy. The float 120 is configured as a case, and the buoyancy forming block 122 and the weight 123 that may adjust buoyancy of the buoyancy forming block 122 within a predetermined range are provided in the float 120.

The buoyancy forming block 122 and the weight 123 may be attached to the float 120 in various manners. For example, a lower end of the float 120 formed as a case may be configured as a lid that may be twisted to open, so that the buoyancy forming block 122 and the weight 123 may be arranged therein via an adhesive. However, embodiments of the present disclosure are not limited to the above example, and the buoyancy forming block 122 and the weight 123 may be provided in the float 120 in other various ways.

Figure 4:
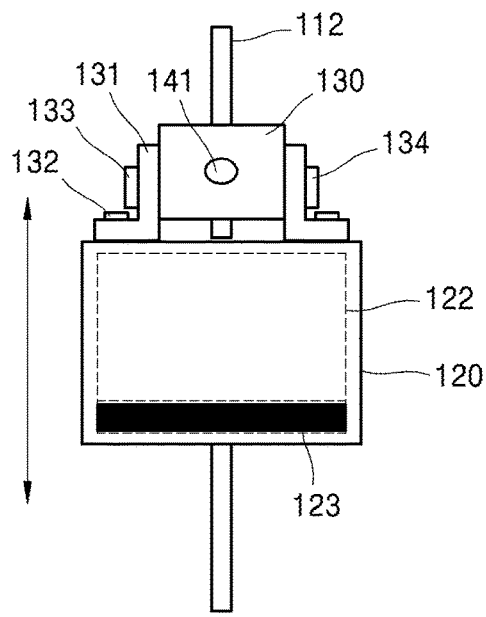
FIG. 4 is a diagram of a float in a chamber seen from a reading portion, according to an embodiment of the present disclosure.
Figure 5:
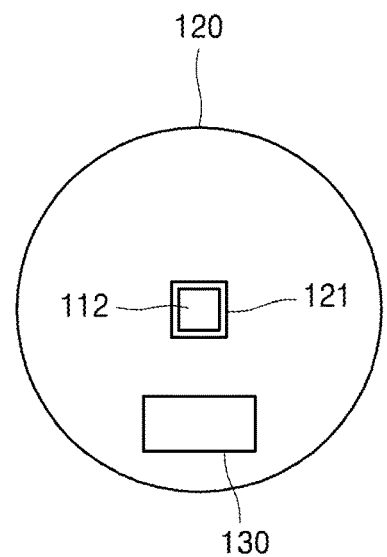
FIG. 5 is a top view of the float according to an embodiment of the present disclosure.

Referring to FIGS. 4 and 5, a guide hole 121 is formed in the float 120 to penetrate through the float 120, and a rail 112 extending in a lengthwise direction of the chamber 110 may be provided in the chamber 110. FIG. 5 is a top view of the float 120, and the guide hole 121 is a hollow-shaped hole penetrating from a top surface to a bottom surface of the float 120. The float 120 may be inserted in the rail 112 via the guide hole 121, and the float 120 may vertically move in the chamber 110 along with the rail 112.

The total reflection prism 130 that will be described later is provided in the float 120, and scatters the laser 141 while changing the trajectory thereof. In order to scatter the laser 141 at a destination point while changing the trajectory thereof through the total reflection prism 130, the total reflection prism 130 has to be fixed. However, since the float 120 floats on the fluid, the float 120 inevitably shakes due to the flow of the fluid unless an additional fixing device is provided.

Thus, when the guide hole 121 is provided in the float 120 and the float 120 is inserted to the rail 112 via the guide hole 121, the float 120 only moves along the rail 112, and accordingly, a range of locating the float 120 may be restricted to a vertical lengthwise direction of the chamber 110. The rail 112 may include various materials according to the fluid, for example, may include plastic or stainless material having an excellent corrosion resistance.

The total reflection prism 130 is provided in the float 120 to scatter light. Referring to FIG. 3, the total reflection prism 130 is provided on a top surface of the float 120, and the total reflection prism 130 changes the trajectory of the laser 141 into a direction perpendicular to the vertical lengthwise direction of the chamber 110 so as to scatter the laser 141 toward the reading portion 111.

Referring to FIG. 4, the total reflection prism 130 is inserted between two brackets 131 disposed on the top surface of the float 120 to be installed on the float 120. The two brackets 131 are fixedly installed on the top surface of the float 120 via fixing screws 132, and the total reflection prism 130 is inserted between the two brackets 131. The total reflection prism 130 is inserted between the two brackets 131 to be rotatable, and as such, the total reflection prism 130 may adjust the proceeding direction of the laser 141. That is, the rotation of the total reflection prism 130 may be adjusted (calibration), and the scattering direction of the laser 141 may be adjusted via the rotation of the total reflection prism 130 so that the laser 141 may be scattered to an exact location on the reading portion 111.

The total reflection prism 130 may be coupled to the brackets 131 in various manners provided that the total reflection prism 130 is rotatable. For example, a fixing bolt 133 having no head may be inserted through a hole formed in an upper center of the bracket 131, the rotation of the total reflection prism 130 is adjusted, and after that, a fixing nut 134 including a hole having a female thread at a center thereof is locked to fix the total reflection prism 130. However, a method of coupling the total reflection prism 130 to the brackets 131 is not limited to the above example, and the total reflection prism 130 and the brackets 131 may be coupled in various ways provided that the total reflection prism 130 is coupled to be rotatable and then fixed.

Figure 6:
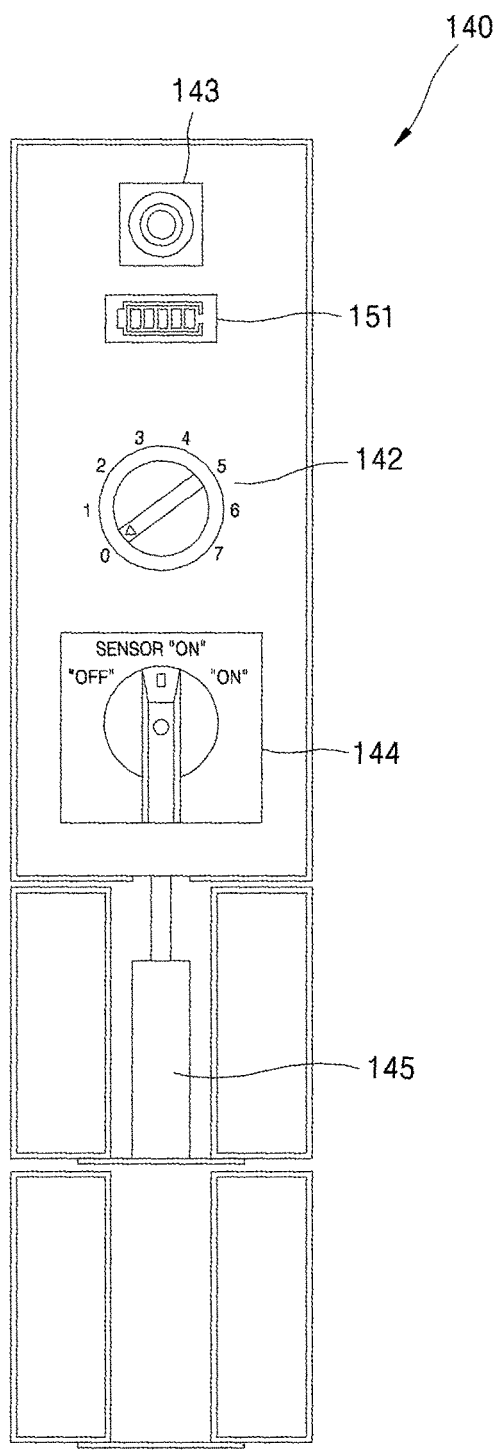
FIG. 6 is a diagram of a laser module according to an embodiment of the present disclosure.

The laser module 140 may irradiate the laser 141 to the total reflection prism 130. Referring to FIG. 6, the laser module 140 may include a power supply 150, a variable resistor 142, a motion sensor 143, a switch 144, and a laser irradiator 145.

The power supply 150 includes a battery 151 that may supply electric power to the laser module 140, and also supplies the electric power for irradiating the laser 141. The power supply 150 may include a connector 152, through which the electric power may be supplied from the outside, and thus, may receive an external power source (220 VAC or 24 VDC), if necessary. The power supply 150 may include a voltage adjustor corresponding to a voltage required by the laser module 140 so as to convert the voltage.

The battery 151 may be detachable so as to be exchanged and charged, and may be a large capacity battery of 10,000 mAh or greater so as not to be necessarily charged even when the power supplier has been operated over one year. The battery 151 may display a remaining capacity thereof to the user via a battery level indicator, and thus, the user may identify a time to exchange or charge the battery 151.

The variable resistor 142 included in the laser module 140 may adjust output of the laser 141 from the laser module 140 according to a peripheral illumination condition, and may adjust the output from the laser module 140 by changing a resistance thereof.

The motion sensor 143 may allow the electric power to be supplied only when a moving object approaches it within a predetermined radius. The motion sensor 143 may include a sensor that may sense a moving object within a predetermined radius and a relay circuit operating according to the sensor. When the sensor senses the moving object within a predetermined radius, the relay circuit starts to operate, and accordingly, the electric power may be selectively supplied to the laser module 140. The motion sensor 143 may be of a type of which a sensitivity may be adjusted, and thus, power consumption due to unnecessary movement may be prevented. Also, the relay circuit of the motion sensor 143 may be configured to block the electric power if no motion is sensed within a predetermined time period to reduce power consumption.

Figure 7:
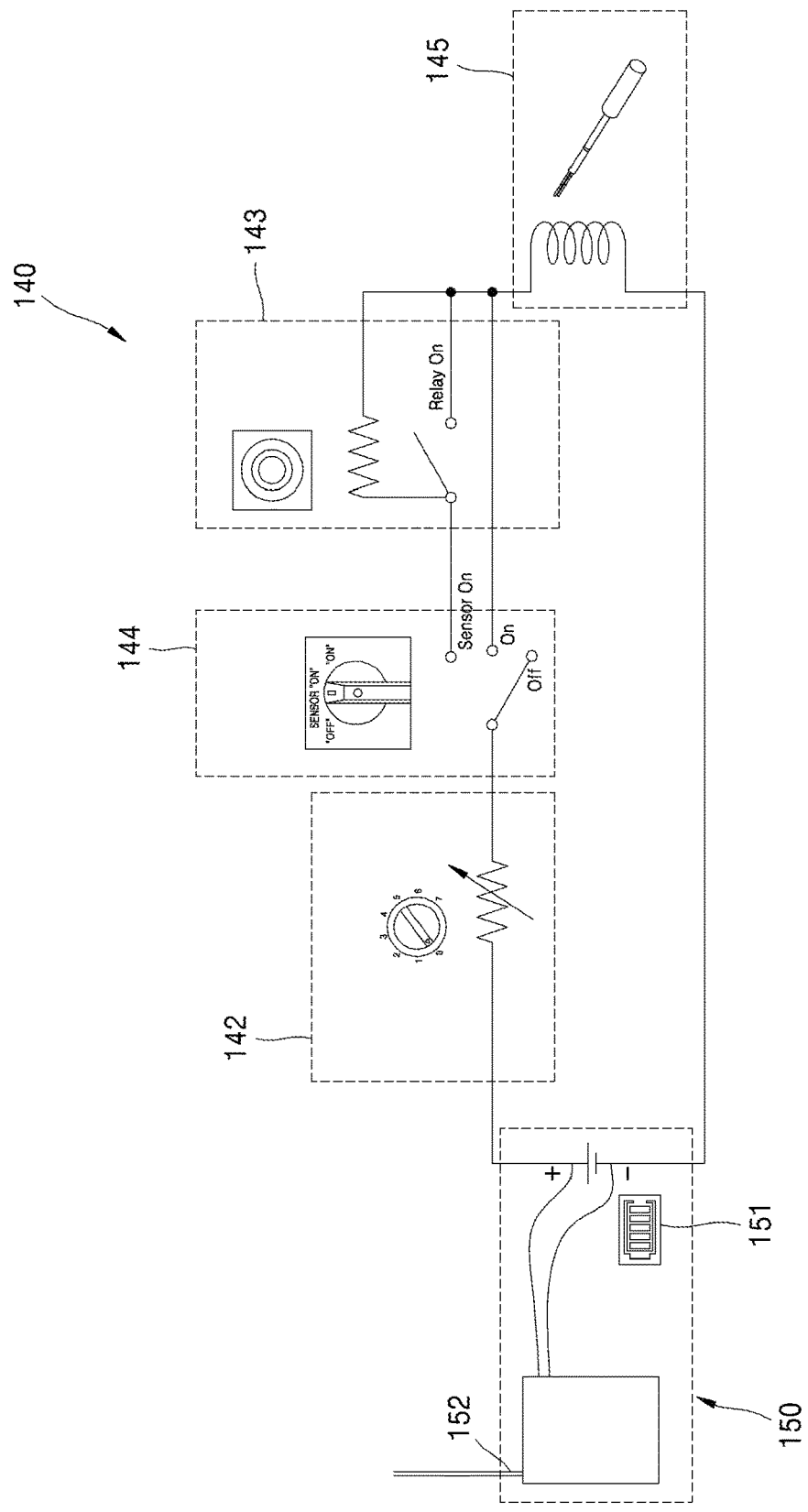
FIG. 7 is a diagram of an internal circuit of a laser module according to an embodiment of the present disclosure.

The supplying of electric power and operations of the motion sensor 143 may be selected according to an operation of the switch 144 that may include three or more poles. Referring to FIG. 7, operations of the switch 144 and overall operations of the laser module 140 will be described as follows in detail.

First, the electric power is supplied through the power supplier 150, and the resistance of the variable resistor 142 is adjusted according to the peripheral illumination condition. The switch 144 may include three or more poles and may operate according to three states: Off, On, and Sensor-on. When the switch 144 is Off, the laser module 140 does not operate so that power consumption of the battery 151 may be reduced. When the switch 144 is On, the laser module 140 is always operated, and the laser 141 is irradiated to the total reflection prism 130 via the laser irradiator 145. The laser irradiator 145 is a device for irradiating the laser 141, and various devices may be used provided that the laser 141 may be irradiated therefrom.

When the switch 144 is in Sensor On state, the motion sensor 143 is operated so that the electric power is supplied only when the moving object is approaches within the predetermined radius. In detail, when the motion is sensed by the sensor within the predetermined radius, the relay circuit starts to operate, the electric power may be supplied to the laser module 140, and the laser 141 is irradiated through the laser irradiator 145 to the total reflection prism 130.

The indication type level indicator including the total reflection prism 130 as described above operates as follows. The laser module 140 is located above the chamber 110 and irradiates the laser 141 to the float 120 located in the chamber 110. The laser 141 is irradiated toward the total reflection prism 130 provided in the float 120.

The laser 141 reaches the total reflection prism 130 provided in the float 120, and the proceeding direction of the laser 141 is changed by the total reflection prism 130. The reading portion 111 is provided in the front surface of the chamber 110, and is located perpendicularly to the vertical lengthwise direction of the chamber 110. The laser 141 reaching the total reflection prism 130 is changed to be perpendicular to the vertical lengthwise direction of the chamber 110, and as such, the laser 141 reaches the reading portion 111. Since the total reflection prism 130 may scatter the light, the laser 141 reaches the reading portion 111 after being scattered.

The reading portion 111 displays the fluid level to be visible via the scattered laser 141 that has reached the reading portion 111, and accordingly, the user may recognize the fluid level in the chamber 110 or the fluid level in the tank 160.

The indication type level indicator including the total reflection prism 130 according to the present disclosure has following effects.

According to the related art, in the case of a water gauge of an equilibrium reflection type, an equilibrium glass type, etc., it may be frequently difficult to identify the water level due to contamination of a glass portion 30 (see FIG. 1A) or interference with a steam part that generates steam. However, according to the present disclosure, the laser 141 is scattered to the reading portion 111 including the semi-transparent glass or plastic material by the total reflection prism 130, and level legibility of the fluid is improved when compared with the water gauge of the related art. That is, since the fluid level is recognized via the scattered laser according to the present disclosure without detecting the water level like in the related art, the level legibility is excellent when compared with that of the reflection type water gauge according to the related art.

Also, the laser 141 generated by the laser module 140 may have high intensity, and the indication type level indicator may be operated without interference with a steam part taking into account the wavelength transmission characteristic of the laser 141 and the transmitting distance of the laser 141 through the steam portion. As such, erroneous recognition of the steam portion as the fluid level may be prevented, and even the glass portion 30 is contaminated, the level legibility may be improved due to the characteristic of the high-intensity laser 141.

According to the related art, a magnetic type water gauge is used in order to compensate for disadvantages of the equilibrium reflection type, the equilibrium glass type water gauge, etc. However, the manufacturing costs of the magnetic type water gauge are high and erroneous level determination occurs frequently due to frequent defects of the flaps. However, according to the present disclosure, the indication type level indicator of the present disclosure has less components than the magnetic type water gauge, and thus, the manufacturing costs may be reduced, and since flaps are not used, erroneous level determination due to defective flaps may be prevented.

Also, in the magnetic type water gauge according to the related art, front and back surfaces of each flap are colored in different colors and then a plurality of flaps are turned over to indicate the water level, and thus, the water level may not be measured linearly due to the limited number of flaps. Therefore, it is difficult to measure the water level varying in an analog manner by using the magnetic type water gauge according to the related art, and the water level may not be measured precisely. However, since the total reflection prism 130 and the scattered laser 141 are used according to the present disclosure, the fluid level may be linearly measured. Therefore, although the fluid level varies in an analog manner, the fluid level may be easily and precisely measured.

Also, the water level is measured by using the total reflection prism 130 and the scattered laser 141 according to the present disclosure, and thus, the legibility may be improved and the water level may be measured without concerning about the wrong recognition even in a space where there is no illumination.

Although a few embodiments of the present invention have been shown and described, it would be appreciated by those skilled in the art that changes may be made in these embodiments without departing from the principles and spirit of the invention, the scope of which is defined in the claims and their equivalents.

The present disclosure provides an indication type level indicator including a total reflection prism provided on a float buoyant in the indication type level indicator so that, when a laser beam is irradiated from an upper portion of the float to be scattered by the total reflection prism, level legibility is improved. Since the level is recognized via the scattered laser unlike in the related art, in which the physical level is recognized as the level in the chamber, the level legibility may be improved.

Also, the indication type level indicator according to the present disclosure may be used in a space having no illumination, and erroneous recognition of the level due to a steam part may be reduced as high-intensity laser is used. In addition, the present disclosure has simple components when comparing with the magnetic type water gauge, and also the manufacturing costs of the indication type level indicator may be reduced.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An indication type level indicator for measuring fluid level, the indication type level indicator comprising:
    a chamber filled with a fluid and comprising a reading portion through which the fluid level is measured;
    a float provided in the chamber and comprising a buoyant material so that the float floats on the fluid and vertically moves up in the chamber along with the fluid;
    a total reflection prism provided on the float and configured to scatter light; and
    a laser module configured to irradiate laser toward the total reflection prism,
    wherein the laser irradiated from the laser module is scattered by the total reflection prism toward the reading portion;
    wherein the laser module comprises a motion sensor configured to allow the electric power to be supplied only when a moving object approaches the motion sensor within a predetermined radius.

2. The indication type level indicator of claim 1, further comprising a tank connected to the chamber and configured to store the fluid,
    wherein fluid level in the tank is identical with the fluid level in the chamber.

3. The indication type level indicator of claim 1, wherein the reading portion is provided in a front surface of the chamber and comprises a semi-transparent glass or plastic material.

4. The indication type level indicator of claim 1, wherein the float comprises a guide hole penetrating through the float, a rail extending in a vertical lengthwise direction of the chamber is provided in the chamber, and the float is inserted in the rail via the guide hole so as to perpendicularly elevate in the chamber along with the rail.

5. The indication type level indicator of claim 1, wherein a buoyancy forming block including a buoyant material and a weight for adjusting buoyancy are provided in the float.

6. The indication type level indicator of claim 1, wherein two brackets are arranged on a top surface of the float and the total reflection prism is rotatably inserted between the two brackets.

7. The indication type level indicator of claim 1, wherein the laser module comprises:
    a power supply comprising a battery configured to supply electric power to the laser module, and a connector configured to receive electric power supplied from outside; and
    a variable resistor configured to adjust a laser output from the laser module according to peripheral conditions.

8. The indication type level indicator of claim 1, wherein the laser module is located above the chamber and is configured to irradiate the laser towards the float in the chamber in a direction parallel with the vertical lengthwise direction of the chamber, so that the laser is scattered by the total reflection prism provided in the float toward the reading portion arranged in a perpendicular direction to the vertical lengthwise direction of the chamber.

* * * * *